Patented Feb. 19, 1952

2,586,487

UNITED STATES PATENT OFFICE 2,586,487

SPIROCYCLOHEXANES AND METHODS OF PREPARATION THEREOF

Louis H. Schwartzman and Gilbert Forrest Woods, Jr., Silver Spring, Md., assignors to Chemectron Corporation, Washington, D. C., a corporation of Delaware No Drawing. Application March 20, 1950, Serial No. 150,807

4 Claims. (Cl. 260—576)

This invention relates to compounds of the spirocyclohexane type and methods of preparation thereof.

More particularly, the invention relates to the synthesis of compounds of the spirocyclohexane type, particularly those having analgesic properties such as possessed by morphine and other opiates derived from natural sources.

Considerable effort has been directed in the past toward the synthesis of suitable analgesics as substitutes for morphine and the like, particularly in view of the fact that the principal source of supply of morphine and related compounds is dependent upon natural sources, most of which are presently located in the Orient. In an effort to produce chemically synthesized analgesics domestically on an economically practicable basis, and to provide a source of analgesics independent of natural supplies of raw materials, many attempts have been made to synthesize various analgesics as substitutes for morphine and the like, some of the more recently developed compounds being

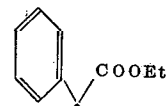

Demerol

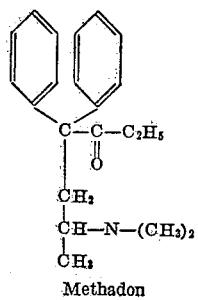

Methadon etc.

Among other things, it has been found that many synthetic compounds produced heretofore, although having some of the analgesic properties of morphine and the like, are not satisfactory from the standpoint of manufacturing costs, and even in some cases are unsuitable for use by human beings because of their high toxicity or side-effects and other undesirable properties.

It is found that compounds of the present invention are not only relatively simple and inexpensive to manufacture from readily available raw materials but, in addition, have satisfactory analgesic properties and are of sufficiently low toxicity to permit safe use by human beings.

In its more specific aspects the present invention pertains to the synthesis of analgesic compositions of the spirocyclohexane type by employing cyclohexanone as a starting material and producing therefrom a large number of new, novel and useful analgesic compounds containing a quaternary carbon atom in the molecule and, in addition, either a primary, secondary, or tertiary amine group.

The invention also provides new and novel methods of preparing the compounds described herein, such methods being particularly advantageous in view of the simplicity of the procedures, economic practicability and comparatively high yields of the intermediates and the end products without the use of complicated or expensive starting materials, apparatus, or processes The intermediates required for synthesis of the compounds of the present invention may be prepared, for example, in the manner described in copending application Serial No. 150,806 filed of even date herewith, by using cyclohexanone as a starting material, treating it with a mixture of calcium carbide and potassium hydroxide to yield an acetylenic glycol such as 1,1'-ethynylene-biscyclohexanol according to the reaction:

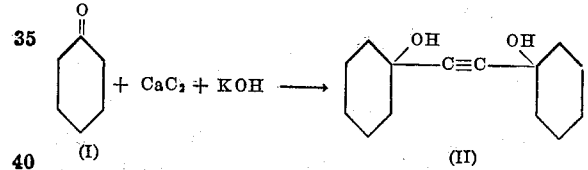

This glycol (II) is then dehydrated to the dieneyne (III) by, for instance, heating the above glycol under reflux conditions with dilute sulfuric acid as follows:

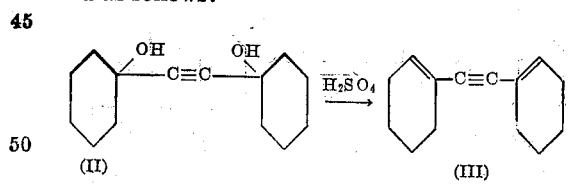

The compound thus obtained is then cyclized and hydrated, for example, by refluxing with formic acid, thus producing as intermediates, cyclic ketones such as spiro[cyclohexane-1,1'-

Δ⁹'-tetrahydroindanone-3'] (IV) and its isomer spiro[cyclohexane - 1,1'-Δ⁸'-tetrahydroindanone-3'] (V) in accordance with the following reaction:

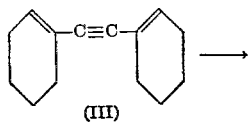

(III)

(IV)   and/or   (V)

To produce the analgesic compounds of the present invention, the cyclic ketones (IV) and/or (V) are converted to the oxime thereof in the well known manner according to the reaction:

(IV) and/or (V)   →NH₂OH, 90%→   (VII)

and thereafter the mixture of oximes (VII) is hydrogenated in the presence of a catalyst to produce an analgesic spiroindane in accordance with the reaction:

(VII)  →Catalyst (PtO₂, H₂) 90%→  (VIII)

Another spiroindane coming within the scope of the present invention may be prepared by further treatment of the spiroindane (VIII) according to the following reaction:

(VIII)  →HCOOH, CH₂O, 85%→  (IX)

Instead of preparing the oxmine as indicated above, the ketones (IV) and/or (V) can be aromatized according to the method described in copending application Serial No. 150,806 referred to hereinabove to produce an aromatic ketone from which there may be prepared a series of aromatized compounds such as aromatic spirocyclohexanes, or spirocyclohexylquinolines, depending upon the desired end products. The following reaction illustrates the aromatization step set forth in that application:

(IV)  →catalyst→  (VI) and/or (V)

The aforementioned spirocyclohexanes and spirocyclohexylquinolines and methods of preparation thereof are set forth in copending applications Serial Nos. 150,808, 150,809 and 150,810 filed of even date herewith.

It is an object of the present invention to provide spiroindanes having analgesic properties. It is a further object of this invention to provide a series of spiroindanes having a quaternary carbon atom and, in addition, a primary, secondary, or tertiary amine group. It is a still further object of this invention to provide amino spirohexahydroindanes of the type:

wherein $\overline{H}$ indicates saturation of the ring and $R_1$ and $R_2$ are selected from the group consisting of hydrogen and lower alkyl groups.

It is a still further object of the present invention to provide methods of preparation of the foregoing type compounds.

For purposes of illustration but without limiting the scope of the patent thereto, representative compounds of the present invention and methods of preparation thereof are described in detail in the following examples:

*Example I*

The cyclic ketones: spiro[cyclohexane-1,1'-Δ⁹'-tetrahydroindanone-3'] (IV) and spiro[cyclohexane-1,1'-Δ⁸'-tetrahydroindanone-3'] (V) are prepared from cyclohexanone in the manner described in copending application Serial No. 150,806, filed on even date herewith.

6.2 grams of the cyclic ketones (IV and V) prepared in the foregoing manner are added to a mixture of 7 grams of hydroxylamine hydrochloride, 13 ml. of pyridine and 33 ml. of absolute alcohol. The solution is refluxed for three and one-half hours and thereafter the solvent is removed under reduced pressure. The resulting crystalline mass is recrystallized from a water-alcohol mixture to produce 6 grams of the non-aromatic oxime of spiro[cyclohexane-1,1'-Δ⁹'-tetrahydroindanone-3'] and/or spiro[cyclohexane-1,1'-Δ⁸'-tetrahydroindanone-3'] of the formulae:

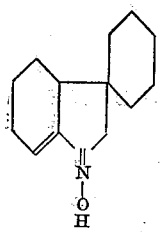

and/or

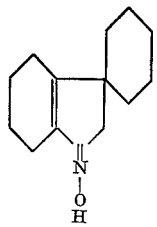

The oximes of spiro[cyclohexane-1,1'-Δ⁸'-tetrahydroindanone-3'] and/or spiro[cyclohexane-1,1'-Δ⁹'-tetrahydroindanone-3'] (18.3 g.) were hydrogenated at room temperature and atmospheric pressure in a glacial acetic acid solution (100 ml.) using Adams' catalyst (1.0 g.). The theoretical amount of hydrogen was absorbed in four hours. After the catalyst was removed by filtration, the solvent was distilled off under reduced pressure to give the acetylated amine, which was hydrolyzed by refluxing for three hours, in twenty percent sodium hydroxide (100 ml.). The amine was isolated from the cooled solution by acid-base extraction. The dried ether solution was distilled in a nitrogen atmosphere to yield spiro[cyclohexane - 1,1' - 3' - aminohexahydroindane] (15.5 g. or 90%): B. P. 119–121° (1.8 mm.), $n_D^{29} \equiv 1.5138$.

This compound possesses the analgesic effects on white mice described in the following chart:

| M. E. D. | L. D.₅₀ |
|---|---|
| 30 mg./kg. body weight | 180 mg./kg. body weight |

The compound has the formula:

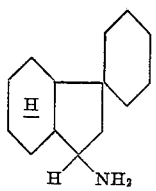

*Example II*

Into a cooled mixture of 5 grams of formaldehyde (37% aqueous sol) and 5 grams of 90% formic acid was added 6.7 grams of spiro[cyclohexane-1,1'-3'-amino-hexahydroindane]. With moderate warming, a vigorous evolution of carbon dioxide ensued. After cessation of the evolution of the gas, the mixture was refluxed on a steam cone overnight. The solution was cooled, neutralized with sodium hydroxide (1 normal) and extracted with ether. The ether extract was dried over anhydrous magnesium sulfate. After removal of the drying agent by filtration, the solvent was removed under reduced pressure and then the tertiary amine, spiro[cyclohexane-1,1'-3'-dimethylaminohexahydroindane] was distilled; boiling point 115–117° at 0.8 mm. $N_D^{35}$ 1.5060, yield 85%.

This compound possesses the analgesic effects on white mice described in the following chart:

| M. E. D. | L. D.₅₀ |
|---|---|
| 15 mg./kg. body weight | 100 mg./kg. body weight | and has the formula:

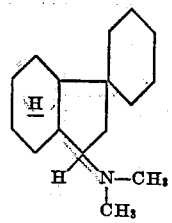

*Example III*

The compound spiro[cyclohexane - 1,1' - 3'-methylaminohexahydroindane] may also be prepared in the manner described in Example II by employing equimolar quantities of the spiro[cyclohexane-1,1'-3'-aminohexahydroindane] and formaldehyde.

This compound has the formula:

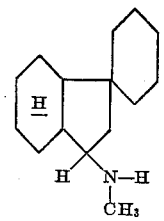

The term M. E. D. is used herein as an abbreviation for the minimal effective dosage for 50% of the animals tested. The term L. D.₅₀ is used herein as an abbreviation for the lethal dosage for 50% of the animals tested.

In the foregoing examples it will be understood that in lieu of the methyl group other lower alkyl groups such as ethyl, propyl, etc., may be incorporated in the molecule by proper selection of the reacting materials in the manner obvious to those skilled in the art. Likewise, it will be understood that the alkoxy group may be methoxy, ethoxy, propoxy, etc., the acyl group may be acetyl, propionyl, butyryl, etc., and the halogen may be the chloride, bromide, iodide, fluoride, etc.

It will be understood that other modifications may be made in the foregoing examples without departing from the scope of the invention. It is intended, therefore, that the patent shall cover by suitable expression in the appended claims the features of patentable novelty residing in the invention.

We claim:
1. Spirocyclohexanes of the type:

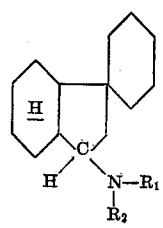

wherein H indicates saturation of the ring and R₁ and R₂ are selected from the group consisting of hydrogen and lower alkyl groups.

2. Spiro[cyclohexane - 1,1' - 3' - aminohexahydroindane] of the formula:

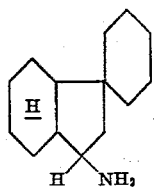

3. Spiro[cyclohexane - 1,1' - 3' - methylaminohexahydroindane] of the formula:

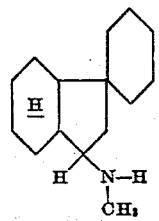

4. Spiro[cyclohexane - 1,1' - 3' - dimethylaminohexahydroindane] of the formula:

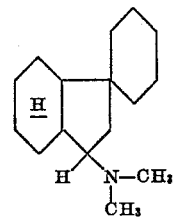

LOUIS H. SCHWARTZMAN.
GILBERT FORREST WOODS, Jr.

REFERENCES CITED

The following references are of record in the file of this patent:

Schwartzman: J. Org. Chem., vol. 15, pp. 517–524 (1950).